June 27, 1950     T. J. MATEGORIN     2,512,956
FLUID CONTROL DEVICE
Filed Sept. 26, 1946     2 Sheets-Sheet 1
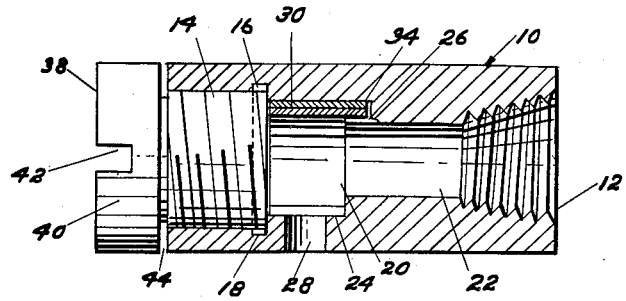
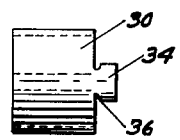
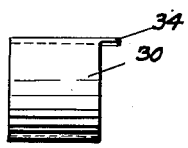
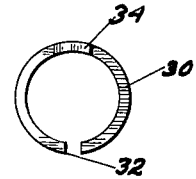
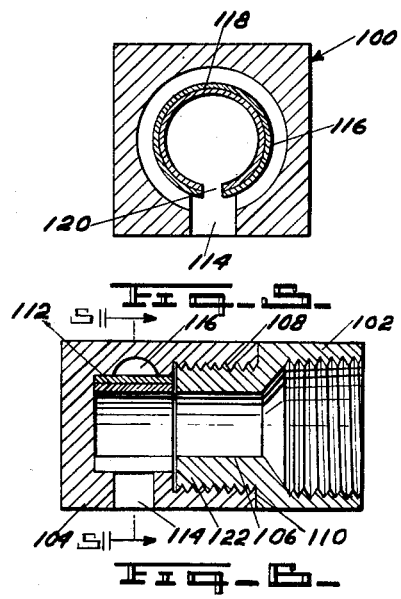
INVENTOR.
THEODORE J. MATEGORIN
BY
ATTORNEY June 27, 1950 T. J. MATEGORIN 2,512,956
FLUID CONTROL DEVICE
Filed Sept. 26, 1946 2 Sheets-Sheet 2

INVENTOR.
THEODORE J. MATEGORIN
BY
ATTORNEY

Patented June 27, 1950

2,512,956

UNITED STATES PATENT OFFICE 2,512,956

FLUID CONTROL DEVICE

Theodore J. Mategorin, Detroit, Mich., assignor to Bendix Aviation Corporation, Detroit, Mich., a corporation of Delaware Application September 26, 1946, Serial No. 699,478

2 Claims. (Cl. 138—45)

This invention relates to fluid control devices.

Broadly the invention comprehends the provision of means for substantially eliminating fluid temperature as a factor in the determination of pressure in any viscous hydraulic circuit. More specifically the invention contemplates the production of a thermally responsive device, which, when connected into a viscous hydraulic circuit, will cause the fluid pressure in the circuit to vary directly as the speed of any given pumping apparatus.

An object of the invention is to provide a control for viscous liquid flow which prevents variations in viscosity, due to temperature, from producing any appreciable change in the fluid pressure.

Another object of the invention is the provision of a thermally responsive controlled orifice, which, when properly calibrated and connected in a viscous fluid circuit, renders the fluid pressure a function of the speed of the pumping means above.

Yet another object of the invention is the provision of a calibrated orifice, the cross-section of which is controlled by thermally responsive means.

Still another object of the invention is to provide a convenient and facile means of maintaining a direct relationship between pump speed and pressure in any viscous fluid circuit irrespective of the fluid temperatures.

A further object of the invention is the provision of a controlled orifice for viscous fluid flow which constricts or dilates to compensate for the decrease or increase of internal friction in the fluid.

A still further object of the invention is to provide a thermally responsive controlled orifice which is reliable, accurate, and inexpensive to produce.

Yet a still further object of the invention is the provision of a thermally responsive controlled orifice which is compact and comprised of relatively few component parts.

Other objects and advantages of the invention will appear from the following description taken in connection with the accompanying drawings forming a part of this specification, and in which:

Fig. 1 is an elevation view partially in section of a structure embodying the invention;

Fig. 2 is a plan view of the split bi-metal ring showing the locating tongue;

Fig. 3 is an elevation view of the split bi-metal ring;

Fig. 4 is an end view of the split bi-metal ring showing the location and size of the axial split;

Fig. 5 is a cross-section view of the assembly in Fig. 6 taken on plane 5—5, showing the location of the annular channel relative to the calibrated orifice;

Fig. 6 is a vertical section view of a structure embodying a modification of the invention;

Figure 7:
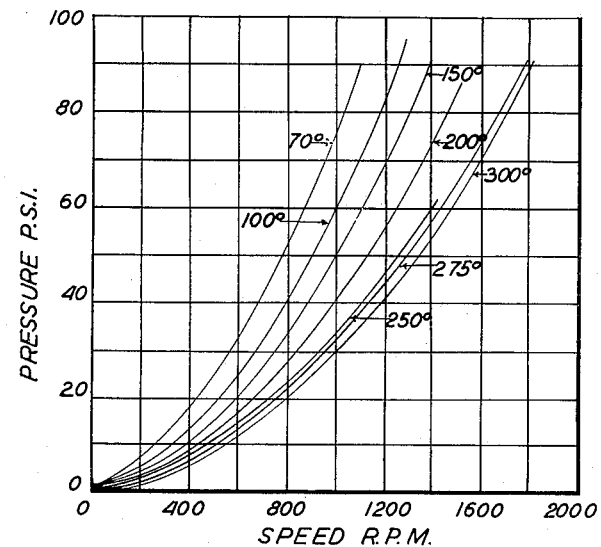
Fig. 7 shows a group of curves illustrating the variation of fluid pressure with temperature change for given values of pump speed without the use of applicant's device in the hydraulic circuit.

Referring to the drawings, for more specific details of the invention, 10 represents a housing having an axial opening therethrough threaded on one end 12 to facilitate connection into a hydraulic circuit, not shown.

The opposite end of the housing 10 is provided with an internal threaded section 14 adjacent to which is an annular undercut 16, having a finished shoulder 18. The central portion of the housing has a double diametral chamber including a large bore 20 and a smaller bore 22 providing therebetween a seating shoulder 24 having an axial slot 26 therein.

A contoured orifice 28 is provided in the wall of the housing 10 substantially opposite the axial slot 26, and in direct communication with the larger bore 20.

A bi-metal ring 30, having an axial slit 32 therethrough and a locating tongue 34 on one end thereof, is fitted into the larger bore 20 of the housing 10, and positioned with the axial slit 32 centrally disposed over the orifice 28. The ring 30 is seated on the annular shoulder 24 and secured against any angular movement relative to the orifice 28 by the locating tongue 34 in cooperation with the axial slot 26.

In practice, it is desirable to relieve the sharp angularities which are normally present at the base of the tongue 34. This may be done, as illustrated in Fig. 2, by placing a small notch 36 on either side of the tongue 34, thus enabling the ring 30 to seat properly on the annular shoulder 24.

End clearance is provided for the bi-metal ring 30 to prevent linear expansion, occurring in the ring at high operating temperatures, from binding the element and thus destroying the orifice calibration.

A plug 38 having a head 40 provided with a diametral slot 42 for the reception of a torque applying tool is threaded into the opening 14 to seal the end of the housing 10. The plug 38 is turned down to seat on the annular shoulder 18 and is so adapted as to provide clearance 44 between the head 40 and the end of the housing.

This clearance 44 is necessary to insure a proper seat between the end of the plug 38 and the annular shoulder 18.

In producing the bi-metal ring 30 it is desirable that materials having large thermal coefficients of expansion be used to provide the outer portion of the ring, whereas materials exhibiting smaller rates of expansion are required for the inner portion. Thus, when the ring 30 is subjected to changes in temperature, the outer portion will expand at a faster rate than the inner portion and consequently produce substantially circular elongation. This prevents the expansive forces, which occur in the ring 30, at high operating temperatures, from causing it to bind on the wall of the confining section 20, and thereby impair the proper functioning of the orifice 28.

A modification of the invention is embodied in the structures shown in Figs. 5 and 6. In this embodiment, a housing 100 is provided comprising two separable components 102 and 104. One portion 102 of the housing has an axial bore 106 therethrough threaded on one end to facilitate connection into a hydraulic circuit, not shown, and the opposite end is provided with an external threaded section 108 terminating at a finished annular shoulder 110.

The other component 104 of the housing 100 has an axial bore 112 therein, an orifice 114 in communication therewith and an annular channel 116 on the inner periphery of the bore 112 communicating at either end with the orifice 114.

A bi-metal ring 118 having an axial slit 120 therethrough, is fitted into the larger bore 112 and is so adapted as to provide end clearance 122 when the two housing components 102 and 104 are assembled as shown in Fig. 6. In this simplified embodiment no locating tongue is required on the bi-metal ring 118 as the annular channel 116 enables the split 120 to communicate with the orifice 114, irrespective of its angular position relative thereto.

This completes a detailed description of the structural embodiments of this invention. However, to facilitate a more thorough comprehension of the invention reference will now be made to the manner in which the devices perform their intended function.

In view of the fact that both embodiments operate in substantially the same manner, the following discussion is applicable to both the preferred embodiment and the modification shown in Figs. 5 and 6.

In use the device is connected into a pressurized hydraulic line, not shown, in which the effect on the pressures of changes in viscosity resulting from temperature variations in the hydraulic fluid is to be substantially eliminated. The orifice is adapted to be connected to a sump or reservoir, not shown, so that the hydraulic fluid by-passed through the orifice may be returned to the working circuit by a hydraulic pump, not shown.

As the fluid is circulated through the working circuit, fluid friction, both internal and external, generates a considerable amount of heat. This heat, which is partially absorbed and retained by the fluid medium, causes the viscosity to decrease as the fluid temperature rises. As a natural consequence of this decrease in internal fluid friction, the pressure diminishes proportionately for any given pump speed. Therefore, to avoid the necessity for increasing the pump displacement to compensate for the loss in friction head, the equivalent back pressure is created by constricting the by-pass orifice.

The amount of constriction is at all times carefully calculated to substantially balance the loss in head occasioned by the change in viscosity. To effect this change in orifice cross-section, at a ratio commensurate with the change in fluid temperature, the split bi-metal ring, which directly determines the effective orifice size, is adapted to respond readily to all temperature variations in the circulating hydraulic medium. Initially, when the hydraulic medium is at a relatively low temperature, the bi-metal ring is contracted and a large portion of the orifice cross-section is exposed.

This permits a considerable volume of hydraulic fluid to by-pass through the orifice and return to the pump intake without passing through the working circuit. However, after the hydraulic fluid has been circulated for a considerable time, the temperature gradually increases and causes the bi-metal ring to expand. This expansion serves to decrease the width of the split in the bi-metal ring which results in a corresponding diminution of the orifice cross-section.

The net effect is a decrease in the amount of fluid by-passed around the working circuit. With no possible means of escape for the pressurized fluid, it is retained in the working circuit and causes a back pressure adequate to compensate for the loss in friction head occasioned by the decrease in viscosity.

The converse of the above reaction naturally follows where the temperature of the hydraulic medium is lowered. Dilation of the orifice, instead of constriction, is produced in an effort to by-pass a sufficient amount of fluid to offset the gain in friction head occasioned by the increase in viscosity.

Another adaptation, conceived of for the applicant's invention, is its use in connection with the pressure regulated controls on a torque converter. To operate in this capacity the device is connected into a pressurized line rather than in the working circuit as previously described. However, as the pressurized control lines are supplied with hydraulic fluid from the working circuit, the effect of viscosity change is readily apparent in the control circuits.

Therefore, the applicant's device functioning as previously described, prohibits the pressure in the control system from reflecting changes in viscosity occasioned by temperature variations in the hydraulic medium.

To further appreciate the effective manner in which the applicant's device operates performance curves are presented for consideration. Fig. 7 shows the variations in pressure for any given pump speed as the temperature changes. As an illustration, at 1100 R. P. M. the pressure varies from 88 p. s. i. at 70° F. to 35 p. s. i. at 300° F. in a typical hydraulic circuit, of the type described, without the use of the applicant's device. In marked contrast to this performance, consider that shown by the curves in Fig. 8, which were obtained from test runs made on the same circuit that produced the curves of Fig. 7, except that the applicant's device was installed.

Figure 8:
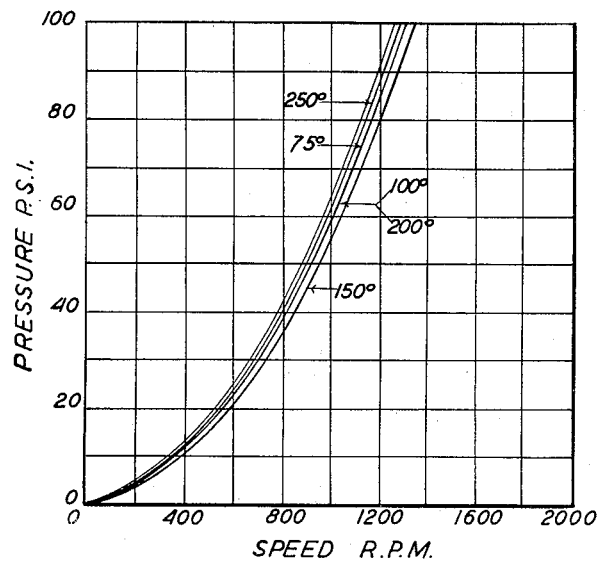
Fig. 8 shows a group of curves illustrating the variation of fluid pressure with temperature change for given values of pump speed with the use of applicant's device in the hydraulic circuit.

A cursory examination of the curves in Fig. 8 reveals that the pressure variations have been greatly reduced for given values of R. P. M.

Closer examination reveals that as the temperature is increased to 250° F., the resulting pressure, for a given pump speed, is actually greater than at 70° F. for the same speed. This in effect means that the regulation may be varied over an almost infinite range to produce the results best suited for any particular adaptation. This variation may be effected by altering the contour of the orifice, changing the total thickness of the bi-metal ring, varying the constituent ingredients of the bi-metal, changing the relative thickness of each material, etc. Each of the above factors, if varied, will produce a corresponding effect on the operating characteristics of the orifice, and, as it is possible to vary these factors individually, collectively or in various combinations, the possible variations in performance are substantially unlimited.

Although this invention was described with reference to the details of a particular modification, it must be appreciated that the principles involved are susceptible of numerous other applications which will become apparent to persons skilled in the art.

Having thus described the invention, what I desire to claim as new and secure by Letters Patent is:

1. In a fluid control device, a housing having an axial bore and an orifice in communication with the bore, and a bi-metal split ring secured in the bore with the free ends of the ring straddling the orifice to vary the effective cross-section thereof in response to changes in the operating temperature of the device.

2. In a fluid control device, a housing having an axial bore and an orifice in communication with the bore, a bi-metal ring in the bore having a split disposed over the orifice so as to control the effective cross-sectional area thereof in accordance with variations in operating temperatures, and means associated with the ring for retaining it in position relative to the orifice.

THEODORE J. MATEGORIN.

REFERENCES CITED

The following references are of record in the file of this patent:

UNITED STATES PATENTS

| Number | Name | Date |
|---|---|---|
| 1,835,790 | Legrand | Dec. 8, 1931 |
| 1,854,964 | Tibbetts | Apr. 19, 1932 |
| 1,918,959 | Culp | July 18, 1933 |
| 1,964,638 | Kreidel | June 26, 1934 |